Jan. 7, 1969    L. H. MORIN    3,420,929
METHOD OF ANCHORING A MONOFILAMENT TO A PLASTIC INJECTION MOLDING
Filed Feb. 21, 1966
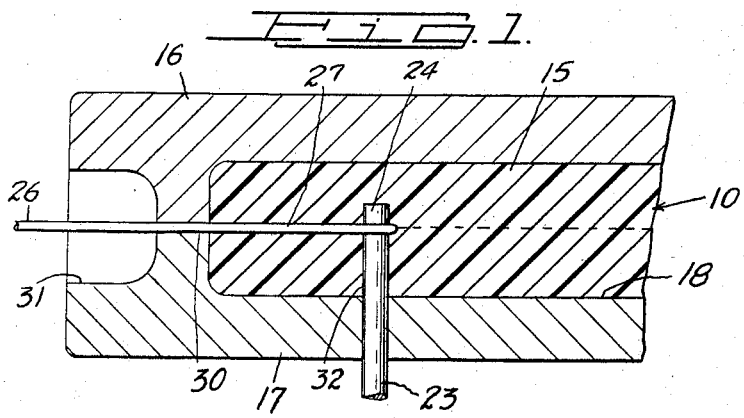
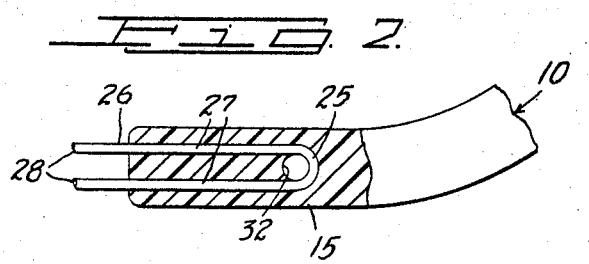
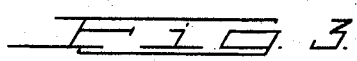
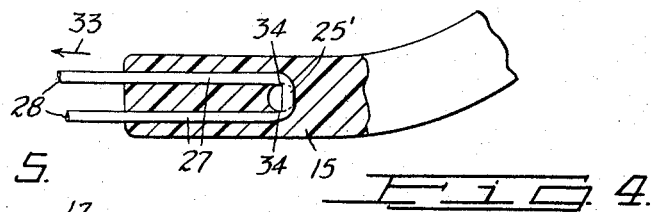
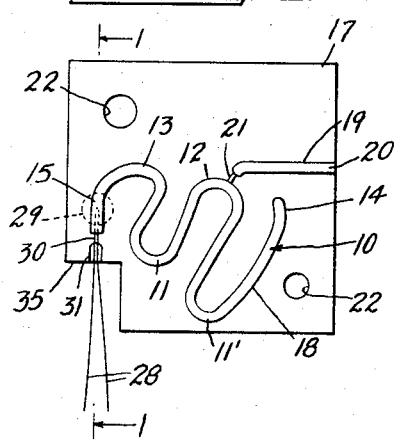
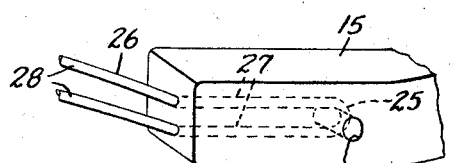
INVENTOR
LOUIS H. MORIN
BY
Howard E. Thompson
ATTORNEY United States Patent Office 3,420,929
Patented Jan. 7, 1969

3,420,929
METHOD OF ANCHORING A MONOFILAMENT TO A PLASTIC INJECTION MOLDING
Louis H. Morin, Bronx, N.Y., assignor to Coats & Clark Inc., New York, N.Y., a corporation of Delaware
Filed Feb. 21, 1966, Ser. No. 528,958
U.S. Cl. 264—278        1 Claim
Int. Cl. B29f 1/00

ABSTRACT OF THE DISCLOSURE

A method of molding a looped monofilament into a molded product is provided wherein an anchor element is supported in a mold cavity and a monofilament is looped around the element disposing two strand portions of the monofilament in parallel relationship to each other where positioned within the molded product, one of the parallel strands of the monofilament being longitudinally tensioned to convert the loop of monofilament into a transverse crosshead. Plastic is injected into the cavity of the mold and around the element and monofilament supported by the element, the element is withdrawn from the molded product, the product is removed from the mold, and the molded product is trimmed.

---

This invention relates to a method of securely fixing or anchoring a monofilament to a body of molded plastic material in support of the monofilament in the cavity of a pair of dies employed for molding the plastic product and wherein the monofilament extends freely beyond the resulting molded product. More particularly, the invention deals with a method, wherein an anchor pin is employed in support of the monofilament in the cavity of a pair of dies and, wherein, the pin is movably supported in one of the dies for withdrawal from the molded product in separation of the dies to release or free the molded product, including the monofilament anchored in the molded product and projecting therefrom.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is an enlarged diagrammatic sectional view through a portion of a pair of dies, illustrating the method of forming a molded plastic product on a monofilament supported in the cavity of the dies, the section being substantially on the line 1—1 of FIG. 5.

FIG. 2 is a sectional plan of the molded product, illustrating one position of the anchored monofilament therein.

FIG. 3 is a view, similar to FIG. 2, showing a modification.

FIG. 4 is a diagrammatic perspective view of the monofilament end portion of the molded product; and FIG. 5 is a diagrammatic face view of one of the dies showing the general contour of the completely molded product formed in the dies, preparatory to removal of the formed product therefrom.

My invention deals with the formation of molded plastic products, wherein it is desirable to attach or definitely anchor a monofilament therewith for the purpose of handling, packaging, displaying or otherwise dealing with the product.

In the accompanying drawing and particularly in the diagrammatic illustration of FIG. 5, the method can be utilized in the production of a plastic molded product, such as illustrated at 10, namely what is commonly known as a Lippes Loop, the purposes and functions of which are well-known in the art.

As diagrammatically shown in FIG. 5, the product 10 is molded to form a series of reversely extending loops 11, 11', 12 and 13, the loop 11 having the terminal end 14; whereas, the loop 13 has an end 15 which will be defined as a monofilament coupling end, shown on very much enlarged scales in FIGS. 1 to 4, inclusive.

Considering FIG. 1 of the drawing, 16 illustrates a small portion of one die which could be an upper die and 17 a small portion of the companion or lower die. Between adjacent surfaces of these dies is formed a mold cavity 18 of a contour to form the molded product 10, by way of illustration. At this time, it is pointed out that a face view of the die 17 is shown in FIG. 5 in a very much reduced scale to primarily illustrate the contour of the cavity 18 for formation of the several loops and ends of the product 10. The dies will have a gate passage 19 for the admission of the plastic material for forming the product 10, leaving on the product a sprue 20, which is later trimmed off at 21 closely adjacent the loop 12. The die 17 shows two alinement holes 22 for reception of alinement pins which would be on the upper die part 16, the latter not being shown. Supported and operating in the lower die 17 is a monofilament anchor or engagement pin or element 23 movably supported in the die 17, so as to position the end 24 of the pin in a desired position in the cavity 18 of the dies, in other words, extending to a degree into the cavity portion formed by the die 16 so as to be beyond the center of the molded product, as diagrammatically seen clearly in FIG. 1 of the drawing. At this time, it will be apparent that the pin or element 23 is withdrawn from the molded product, so as to leave a rounded loop 25 on the monofilament 26, the monofilament defining two parallel strands 27 spaced apart within the end 15 of the product 10, as clearly noted in FIG. 2 of the drawing. The ends 28 of the monofilament project a predetermined degree beyond the molded product, this degree depending upon requirements of the particular molded product which is formed.

The pin 23 is fixed to and operated by a suitable plunger, outlined in dotted lines at 29 in FIG. 5 of the drawing, this plunger being intermittently actuated for positioning the pin 23 in the dies and for withdrawal of the pin, as will be apparent. The dies include a portion, grooved, as at 30 in FIG. 1 of the drawing, for support of the monofilament in the spaced relationship illustrated by the arrangement in FIG. 2 of the drawing. Beyond the grooved area 30, the dies will have an enlarged recess 31, note FIG. 5, from which the monofilament ends 28 freely extend.

In some methods of procedure, the withdrawal of the pin or element 23 from the molded product can leave at one side of the end 15 an aperture or recess 32, note FIG. 4 of the drawing. However, it is possible, in controlling the molding operation, to gradually withdraw the pin or element 23 during the molding operation, until the end 24 is flush with the surface of the cavity 18 of the die 17. This procedure will substantially fill the space from which the pin or element has been withdrawn. On the other hand, if deemed desirable, other means could be employed for plugging the aperture or recess 32.

Considering FIG. 3 of the drawing, I have found that, upon completion of the molded product, as seen in FIG. 2, if one of the monofilament projecting ends 28 is pressure withdrawn in the direction of the arrow 33, FIG. 3, the loop 25 can be reduced to a transverse crosshead 25', as diagrammatically seen in FIG. 3 of the drawing. This will result in establishing a positive lock or coupling with the edges 34 of the rounded portion of the aperture or recess 32, as diagrammatically seen in FIG. 3 of the drawing.

The foregoing operation of producing the crosshead 25' can be produced automatically in the production of devices of the kind under consideration at the time that the molding operation takes place for molding the product 10 and simultaneously with at least a partial withdrawal of the pin 23.

The method of procedure in producing an end product, such as the product 10 shown by way of illustration, will be understood from the foregoing description, with the following added notations.

Initially, the pin 23 will be projected into the position shown in FIG. 1 in the die 17; whereupon, a monofilament is wound around the protruding end of the pin and positioned within the grooves 30 of the die 17. Thereafter, the die 16 is moved into closed position. The injection molding of the plastic then takes place through the gate 19 in forming in the cavity 18 of the dies a product, as at 10, formed around the monofilament and the pin; whereupon, movement of the pin 23 can take place in manners previously described, the dies separated and the resulting end product assemblage removed from the dies, namely the product 10, with the monofilament anchored therein and projecting therefrom, as with the ends 28. These ends can be trimmed to a desired predetermined length.

In production of various types and kinds of products, different plastics will be used in the formation of the end products and different types and kinds of monifilament or other strands can be utilized. With end products, such as the product 10, molded plastics satisfying the requirements of a product of this type and kind will, of course be employed and this is also true of the monofilament employed. With products, such as shown at 10, readily flexible plastics are employed, such, for example, as polyethylene, and the monofilament will be composed of a plastic or other material suitable for use in a product similar to the product 10, diagrammatically illustrated in FIG. 5 of the drawing.

Considering the end product produced according to the method disclosed, it will be apparent that the monofilament or the loop or crosshead portion thereof contained within the end 15 of the product is securely anchored and the two strands extending from the loop or crosshead are disposed in parallel relationship to each other, with a substantial amount of plastic material enveloping these parallel sides. The finished product then has the monofilament ends, as at 28, extending from the end 15 and in alinement therewith, so that there is no obstruction whatever formed on the end 15 of the molded product where the monofilament is fixed or anchored therein.

Having fully described my invention, what I claim as new and desire to secure by Letters Patent is:

1. The method of producing injection molded plastic products including a monofilament anchored in and projecting from a portion of said molded product, which consists in supporting an anchor element in the cavity of a pair of dies in which the cavity conforms to the contour of the desired end product to be molded, said element comprising an anchor pin, around which the monofilament is looped disposing two strand portions of the monofilament in parallel relationship to each other where positioned within the molded product, and one of the parallel strands of the monofilament being longitudinally tensioned to convert the loop of the monofilament into a transverse crosshead in definitely establishing anchorage of the monofilament in the molded product, movably supporting said anchor element in one die and projecting an end part of said element into the cavity portion of the companion die, then mounting a monofilament on said end part of the element, then closing said dies, supporting the monofilament in grooved portions of said dies, then pressure injecting plastic material into the cavity of the dies and around said element and monofilament supported by the element, withdrawing said element from the product being molded, then separating the dies and removing the molded product therefrom, and finally trimming said molded product to form the resulting end product, including the monofilament anchored in a part of the product and including at least part of thte monofilament projecting from the end product.

References Cited

UNITED STATES PATENTS 2,859,936  11/1958  Warnken _____ 18—36 X
3,074,112  1/1963  Bobrow _____ 264—275 X

FOREIGN PATENTS 94,810   1922  Switzerland.

ROBERT F. WHITE, *Primary Examiner.*

J. H. SILBAUGH, *Assistant Examiner.*

U.S. Cl. X.R.

18—36; 128—130